United States Patent [19]
Nachtigal

[11] 3,754,487
[45] Aug. 28, 1973

[54] METHOD AND APPARATUS FOR CONTROLLING A MACHINE TOOL

[76] Inventor: Chester L. Nachtigal, 1310 S. 12th St., Lafayette, Ind. 47905

[22] Filed: Jan. 3, 1972

[21] Appl. No.: 215,200

Related U.S. Application Data

[63] Continuation of Ser. No. 885,686, Dec. 17, 1969, abandoned.

[52] U.S. Cl. ..................... 82/1 C, 82/2 B, 318/561
[51] Int. Cl. ........................................... B23b 1/00
[58] Field of Search ............. 82/2 B, 1 C, DIG. 9; 90/13.99; 318/561

[56] References Cited
UNITED STATES PATENTS

| | | | |
|---|---|---|---|
| 3,259,023 | 7/1966 | Rieger et al. | 90/13 C |
| 2,498,881 | 2/1950 | Eldridge | 82/34 X |
| 3,473,435 | 10/1969 | Tse et al. | 82/DIG. 9 |

Primary Examiner—Leonidas Vlachos
Attorney—Verne A. Trask, Thomas P. Jenkins et al.

[57] ABSTRACT

A method and apparatus for controlling the operation of a machine tool on a workpiece in which said workpiece and tool are mounted in a machine tool assembly in a position to permit said tool to engage the workpiece to perform work operations thereon and in positions such that a pair of reference points on said workpiece and tool are disposed in spaced relationship. One or both of the workpiece and tool are connected to a first driving member for effecting relative movement between them so that said tool will perform the desired work on the workpiece at their interface. The force exerted on the workpiece by the tool at their interface is detected, and such force is transduced into a response signal. This signal actuates a second driving member, and that second driving member is coupled to one of said workpiece or tool for effecting relative movement therebetween to maintain the reference points on the workpiece and tool at predetermined spaced distances from each other during the performance of the work.

7 Claims, 6 Drawing Figures

PATENTED AUG 28 1973 3,754,487

INVENTOR
CHESTER L. NACHTIGAL
BY
ATTORNEYS

METHOD AND APPARATUS FOR CONTROLLING A MACHINE TOOL

This application is a continuation application of my copending application Ser. No. 885,686, filed Dec. 17, 1969, now abandoned.

BACKGROUND OF THE INVENTION

In the operation of lathes, milling machines, drill presses, broaching machines, etc., wherein a machine tool removes material from a workpiece, severe vibrational or oscillating motion forces can be established. These vibrations can be created in a variety of different ways. For example, the workpiece may be mounted in a noncentered position on the machine; it may be out of round; it may have an irregular surface configuration; it may contain discontinuous hard or soft areas, etc. In the latter condition, the tool engaging a hard spot will tend to skip an adjacent soft area and vibrational forces between the tool and workpiece will be created. Such vibrational forces may also be established when the machine is operating at its own resonant frequency. Vibrational forces can also be created by outside forces; such as vibrational forces imparted to the machine through the floor upon which the machine is mounted. All of these vibrations create a deviation in the normal path of movement of the workpiece surface past the tool, that is, a relative movement between the workpiece and the tool at their interface. This results in the tool imparting nonuniform cutting forces to the workpiece surface moving past the tool thereby machining an undesired and nonuniform surface on the workpiece and resulting in a lack of dimensional precision from one workpiece to another. Further, the vibrations, under certain circumstances, may be amplified to create regenerative chatter between the workpiece and tool and further increase the nonuniformity of the machining operations.

My invention compensates for any such vibrations to permit the tool to more quickly assume a relative position with respect to the workpiece such that the vibrations are suppressed and the static stiffness of the machine tool is increased. This permits an increased rate of production and results in the reduction of noise levels due to vibrational motion, longer tool life, longer machine life, and increased dimensional precision between workpieces.

SUMMARY OF THE INVENTION

In accordance with one form of my invention, as it may be employed in a lathe, the workpiece is mounted on the lathe and the tool housing containing the tool in its tool holder is moved to bring the tool into contact with the surface of the workpiece on which the work is to be performed. A pair of spaced reference points are established on or with respect to the workpiece and tool. Such reference points may be, for example, the centerline of the workpiece and the tool cutting edge, both of which are disposed at known spaced distances from the inner face of the tool housing.

The workpiece is rotated with the tool in bearing engagement with it, and the force exerted by said tool on the workpiece at their interface is detected in a continuous manner, as by a strain gage. The detected force is converted into a first electrical signal proportional to the instantaneously occurring cutting force. This first signal is then fed to a controller which acts upon it in a continuous manner and produces a second signal proportional to the desired tool position. The position of the tool is detected and fed back through a transducer to form a third electric signal which is compared with the second signal with the resultant of two signals operating a servo valve controlling the actuation of a servo motor. The servo motor is connected to the tool holder for thus moving the tool with respect to the tool support housing to keep the same relative distances between the workpiece and tool reference points irrespective of the vibratory movements of said workpiece.

In the operation of the system, if the workpiece is out of round, the surface of said workpiece will move toward and away from the tool thus creating a varying cutting force which in turn causes the centerline reference point to deviate from its desired location. This change in force is detected and causes a first signal to be generated and fed to the controller to create a second signal. Simultaneously, a third electrical signal is generated in response to the tool position. Said second and third signals are compared and their resultant signal is fed through the servo motor to the tool causing it to move in the same direction as the centerline to thereby maintain the predetermined distance between the tool and the workpiece reference points so that said tool and workpiece centerline will continue to have substantially the desired predetermined spaced relationship one to the other. With the tool moving in the same direction as the vibrating centerline of the workpiece, the vibrations of the workpiece will be dampened and the workpiece will more quickly assume a stable state.

BRIEF DESCRIPTION OF THE DRAWINGS

The accompanying drawings illustrate the invention. In such drawings.

DETAILED DESCRIPTION OF THE PREFERRED EMBODIMENT

For purposes of convenience, the invention is described herein as being employed for controlling the operation of a lathe assembly. It is to be understood, however, that said invention can be employed for controlling the operation of any machine tool on a workpiece in which portions of said workpiece are removed by the tool.

Figure 4:
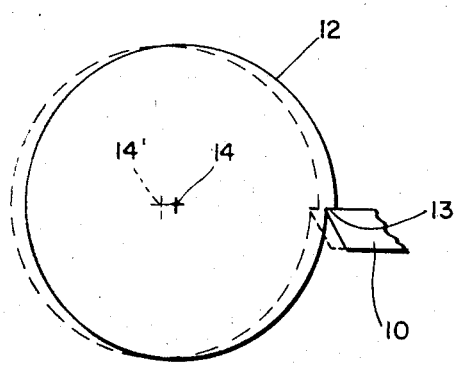
FIG. 4 is an enlarged diagrammatic showing of the workpiece and tool and indicating their relative positions in a vibratory state.

As illustrated in FIG. 4, in such a lathe operation the tool 10 is disposed in cutting engagement with a workpiece 12 for removing a portion of said workpiece, as at 13, as the workpiece is rotated with respect to said tool. Because of various conditions which may exist, such as for example, the lathe operating at its resonant frequency, a noncentered mounting of the workpiece on the lathe, the workpiece being out-of-round, the workpiece having irregular surface con-figurations, the workpiece having discontinuous hard and soft areas, extraneous vibrational forces being imparted to the workpiece through the lathe, etc., said workpiece may vibrate with respect to the tool during the cutting operation. For example, as shown in FIG. 4, the workpiece may vibrate between the full line position in which its centerline is disposed at point 14 and the dotted line position in which its centerline is disposed at point 14'. If compensation for such vibrational movement is not made in the tool 10, a regenerative chatter may be established, and even in the absence of any such regenerative chatter, the tool 10 will make irregular cuts in the vibrating workpiece as it rotates past said tool. Therefore, my invention compensates for such vibratory movement of the workpiece by creating a corresponding continuously responsive movement of the tool. Thus, for example, when the workpiece vibrates into the dotted line position shown in FIG. 4, the tool 10 will also move into its dotted line position represented in FIG. 4 thereby permitting said tool to remove a uniform chip thickness from the vibrating workpiece.

As diagrammatically represented in the drawings, the workpiece 12 is mounted on a lathe 16 and is rotatably driven by a lathe motor 18. The tool 10 is carried in a tool holder 24 mounted on a tool housing 22. Any suitable driver 25 may be connected to the housing 22 to advance it inwardly toward the workpiece as the cutting operation proceeds. A pair of reference points are established on the tool and the workpiece. Conveniently, in the illustrated embodiment, the workpiece reference point is the centerline 14 of the workpiece, and the tool reference point is its cutting edge.

Figure 2:
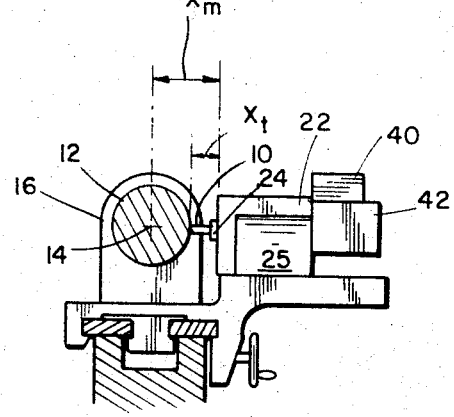
FIG. 2 is a transverse section taken on the line 2—2 of FIG. 1.

In order to keep the tool 10 in the desired cutting engagement with the workpiece 12 during the vibratory movements of said workpiece to produce a uniform chip thickness as the tool cuts into said workpiece, it is necessary to establish and maintain a controlled spatial relationship between the reference points on the workpiece and tool. Thus, as shown in FIG. 2, the invention provides a means for continuously and instantaneously changing the value of the dimension $X_t$ in response to changes in the cutting force, said changes in the cutting force being a function of changes in $X_m$. The values of $X_m$ and $X_t$ are the distances between the two reference points and the inner face of the tool housing 22.

During the cutting operation, the driver 25 will progressively advance the housing 22 toward the workpiece. This causes $X_m$ to progressively decrease, and, in the absence of vibratory movement in the workpiece, $X_m$ will decrease at a substantially straight line rate as indicated by line A in FIG. 5. Since the tool is supported from the housing 22 and is movable therewith, in the absence of any reciprocating movement being imparted to the tool to compensate for workpiece vibrations, $X_t$ will remain constant as indicated by line B in FIG. 5. Should the workpiece vibrate, however, $X_m$ will assume values like those represented by line C in FIG. 5, and with the tool moving to compensate for such workpiece vibrations, $X_t$ will assume values like those represented by line D in FIG. 5.

Figure 3:
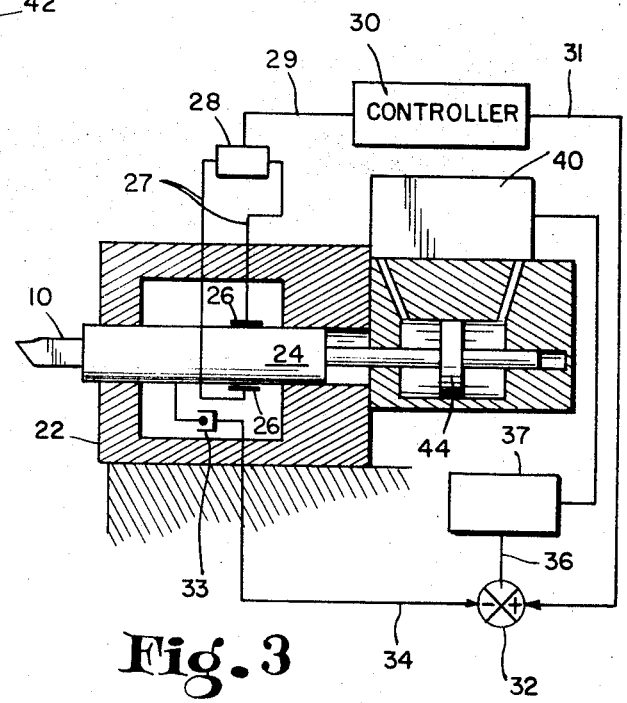
FIG. 3 is a diagrammatic showing of the tool servo motor shown in FIG. 1.

As shown in FIG. 3, the tool holder 24 for tool 10 has a strain gage 26 mounted thereon for continuously and instantaneously detecting the cutting force of the tool on the workpiece as the workpiece is rotated past said tool. The signals from the strain gage 26 are transmitted by lines 27 to a transducer 28. The transducer signals are transmitted by line 29 to controller 30 comprising an electrical signal shaping network, and its signals in turn are transmitted by a line 31 to a summing junction 32.

A position measuring transducer 33, conveniently a linear variable differential transducer, is connected to the tool holder 24. The transducer 33 continuously and instantaneously converts the linear movement of the tool holder 24, and thus the tool 10, into an electric signal which is transmitted along line 34 to the side of the junction 32 opposite its connection to the controller 30. In this manner, there is provided a closed loop feedback system for the tool 10. The output of the junction 32, which is a signal produced by the difference resultant of the signals received from the transducer 33 and controller 30, is fed by line 36 through an amplifier 37 to a servo valve 40 adapted to control a servo motor 42 having its piston 44 connected to the tool holder 24.

In operation of the system illustrated, the workpiece 12 is mounted on the lathe, and the tool 10 is moved into a position such that it will remove the desired chip thickness from said workpiece as it is rotated past the tool. Thus, the locations of the reference points, as represented by the workpiece centerline 14 and the tool cutting edge, are established so that there is an established relationship between the dimensions $X_t$ and $X_m$. With the tool disposed in the desired cutting engagement with the workpiece, the cutting force of said tool at its interface with the workpiece 12 is continuously and instantaneously detected by strain gage 26, which force is translated through the transducer 28 and controller 30 as a reference voltage imposed upon the summing junction 32. From knowledge of the machine characteristics the controller is designed or adjusted to respond to the cutting force signal generated by the strain gage 26 so as to produce a signal which is proportional to $X_m$ and which also serves as a reference for the tool position $X_t$. Simultaneously with the development of the strain gage signal, the position of the tool ($X_t$) is detected, and a signal corresponding to that position is fed from the transducer 33 to the junction 32.

Figure 5:
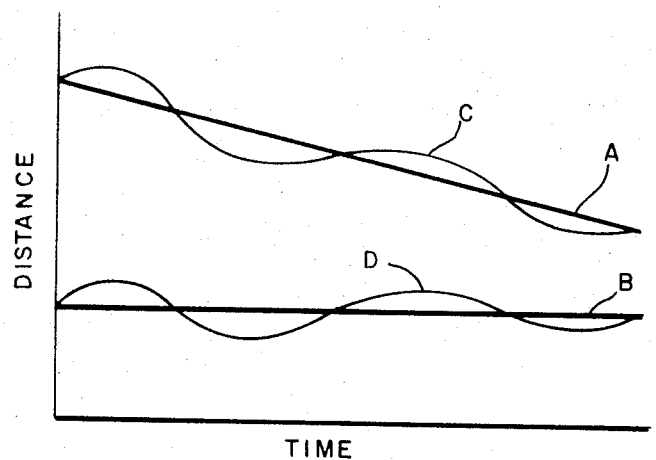
FIG. 5 is a graphic representation of the relative tool and workpiece reference point locations during one pass of the cutting tool over the workpiece in the assembly shown in FIG. 1.

In the absence of any vibration of the workpiece 12 during its rotation past the tool 10, $X_m$ will decrease at a predetermined constant rate with respect to $X_t$ as housing 22 is advanced toward the workpiece as the cutting operation proceeds as shown by line A in FIG. 5. Also, the cutting force will remain constant. However, should the workpiece 12 assume a vibrating motion during its rotation, thus causing it to move toward and away from the tool 10 as represented by the dotted and full lines shown in FIG. 4 and line C in FIG. 5, the cutting force exerted by the tool 10 will change causing the strain gage 26, transducer 28, and controller 30 to change the voltage imposed upon the junction 32. This creates an imbalance between the voltages imposed upon the junction 32 by the controller 30 and transducer 33 whereby a new output resultant voltage of the junction 32 is transmitted through the amplifier 37 to the servo valve 40 causing it to actuate the servo motor 42 to move the tool 10 in a direction to re-establish a balance between the voltages imposed upon the junction 32.

Thus, for example, should the workpiece vibrate in a direction to move its centerline away from the tool 10 and thus increase $X_m$ with respect to $X_t$, the cutting force of tool 10 will be changed. This difference in the cutting force is detected by the strain gage 26 so that the signal transmitted by the gage through the transducer 28 to the controller 30 is changed, and said controller will impose a different voltage on the junction 32 with respect to the voltage imposed on said junction by the transducer 33, whereupon the valve 40 will actuate the motor 42 to drive the tool 10 in the same direction as the centerline 14 is moved away from said tool. The movement of the tool 10 is detected by the transducer 33 to thus change the voltage that it imposes upon the junction 32 thereby bringing the voltages imposed by the controller and transducer on junction 32 into balance. Further, by measuring or detecting the position of the tool with respect to its mounting structure, the movement of the piston 44 can be very accurately con-trolled to permit the tool to perform very precise machining operations. Thus, as shown in FIG. 5, the deviations in $X_m$ due to the vibrating workpiece are shown by line C, and corresponding in phase deviations in $X_t$ as shown by line D are produced to compensate for such workpiece vibrations.

As will be seen, such reciprocal movement of the tool 10 in response to the vibratory movement of the workpiece 12 maintains the distances $X_t$ and $X_m$ in the proper relationship as the workpiece is rotated past the tool although $X_m$ will decrease with respect to $X_t$ at a predetermined rate as the tool advances into the workpiece during its successive revolutions of the workpiece. By moving the tool in response to, and substantially simultaneously with, the vibrating workpiece 12, the vibrations of said workpiece are dampened both in amplitude and duration. Further, such vibratory compensating movement of the tool will cause said tool to effect a substantially uniform chip thickness removal from the workpiece and thereby create dimensional precision between workpieces.

Figure 1:
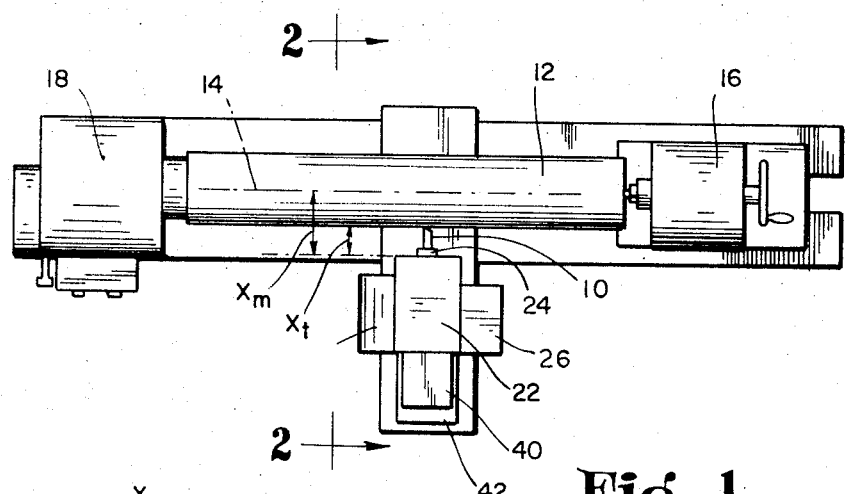
FIG. 1 is a diagrammatic showing of the invention as may be practiced in a lathe assembly.
Figure 6:
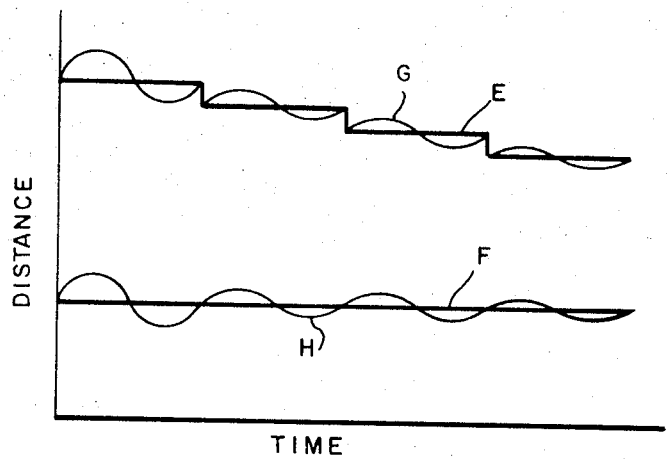
FIG. 6 is a graphic representation similar to FIG. 5, but depicting the relative tool and workpiece reference point locations during a reciprocating stepwise cutting operation.

Because of the machine and workpiece characeristics in the lathe assembly shown in FIGS. 1 and 2, it is the workpiece that vibrates with respect to the tool. And because of the type of machining operation involved, there is a substantially continuous cutting operation whereby $X_m$ decreases in a continuous manner during the machining operation. In a planing operation the situation is somewhat different. There, because of the machine characteristics, the workpiece is fixed and any vibratory movements occur in the tool support. Any such vibratory movements will, however, still create deviations in $X_m$ which necessitate corresponding deviations in $X_t$ if a uniform cutting force is to be maintained. Further, in the operation of such assemblies, the cutting operations proceed in a stepwise manner as the tool or workpiece are transversed back and forth one with respect to the other. Thus, FIG. 6 shows the curves for $X_m$ and $X_t$ in such a planing operation. As shown by Line E, in a static or nonvibrating state, $X_m$ decreases in a stepwise manner as the machining proceeds while $X_t$ remains constant as shown by line F. However, if a vibratory movement occurs, $X_m$ will deviate in the manner shown by line G. A corresponding deviation is established in $X_t$ as shown by line H in the manner previously described so as to maintain a substantially uniform cutting force.

While the invention has been described as employing an electrical signal and servo motor assembly to effect tool movement in response to vibratory movement of the workpiece, it is to be understood, of course, that any desired response and driving system can be employed to effect the desired tool movement in response to the vibratory movement of the workpiece. Further, it may also be desired to sense the cutting force and effect a corresponding tool movement on a stepwise basis instead of a continuous basis.

I claim:

1. An apparatus for controlling a cutting tool in which a workpiece and said cutting tool are mounted in a machine tool assembly and one of said workpiece and cutting tool is moved with respect to the other to cause said cutting tool to cut into said workpiece, comprising first means operatively connected to said cutting tool for measuring its cutting force on the workpiece, transducer means coupled to said first means for producing a first electric signal, a signal shaping network receiving said first electric signal and converting it into a second electric signal related to the desired position of said cutting tool, second means operatively connected to said cutting tool for detecting the actual position of said tool and converting such actual position into a third electric signal, a summing junction adapted to receive and combine said second and third electric signals into a fourth electric signal, and a driver operatively connected to said tool and actuated by said fourth electric signal to move said cutting tool with respect to said workpiece to maintain said workpiece and cutting tool in predetermined spatial relationships during the cutting operation irrespective of any vibrating movements of said workpiece or machine tool assembly.

2. The invention as set forth in claim 1 in which said first means comprises a strain gage operatively connected to said cutting tool, said transducing means comprises a transducer coupled to said strain gage and said signal shaping network, and said second means comprises a second transducer operatively connected to said cutting tool.

3. An apparatus for controlling a cutting tool in which a workpiece and said cutting tool are mounted in a machine tool assembly and one of said workpiece and cutting tool is moved with respect to the other to cause said cutting tool to cut into said workpiece, comprising a strain gage operatively connected to said cutting tool for measuring its cutting force, a transducer coupled to said strain gage and a signal shaping network, said transducer and signal shaping network producing a first electrical signal adapted to serve as a reference signal for the desired position of said tool, a second transducer operatively connected to said tool adapted to produce a second electrical signal in response to the position of said tool, a summing junction connected to said signal shaping network and second transducer for combining said first and second electrical signals, and a servo motor operatively connected to said tool and controlled by a servo valve actuated by the signal from said summing junction, said servo motor moving said tool with respect to said workpiece to maintain said cutting tool and workpiece in predetermined spatial relationships during the cutting operation irrespective of any vibratory movements of said workpiece or machine tool assembly.

4. An apparatus for controlling a cutting tool in which a workpiece and said cutting tool are mounted in a machine tool assembly and one of said workpiece and cutting tool is moved with respect to the other to cause said cutting tool to cut into said workpiece, comprising first means operatively connected to said tool for measuring its cutting force on the workpiece, means coupled to said first means producing a first electric signal adapted to serve as a reference signal for the desired position of said cutting tool, second means operatively connected to said cutting tool for detecting the actual position of said cutting tool and converting said position into a second electric signal, means for combining said first and second signals to produce a resultant signal, and a driver operatively connected to said tool and actuated by said resultant signal to move said tool with respect to the workpiece to maintain said cutting tool and workpiece in predetermined spatial relationships irrespective of any vibratory movements of said workpiece or machine tool assembly.

5. An apparatus for controlling a cutting tool in which a workpiece and said cutting tool are mounted in a machine tool assembly and one of said workpiece and cutting tool is moved with respect to the other to cause said cutting tool to cut into said workpiece, comprising first sensing means operatively connected to the cutting tool for measuring its cutting force on the workpiece, means coupled to said first sensing means for converting the measurement of said cutting force into a first electrical signal related to the desired position of said cutting tool, second sensing means operatively connected to the cutting tool for detecting the actual position of said cutting tool and converting such actual position into a second electrical signal, means for combining said first and second electrical signals into a resultant signal, and a driver operatively connected to said cutting tool and actuated by said resultant signal to move said cutting tool with respect to said workpiece to maintain said workpiece and cutting tool in predetermined spatial relationships during the cutting operation irrespective of any vibrating movements of said workpiece or machine tool assembly.

6. A method of controlling the operation of a cutting tool on a workpiece, comprising the steps of mounting said workpiece in a machine tool assembly in a position to permit said cutting tool to engage said workpiece and with a spaced distance between a pair of reference points on said cutting tool and workpiece, coupling at least one of said workpiece and cutting tool to a first driving member for effecting a first relative movement therebetween whereby said cutting tool will perform the desired work on said workpiece at their interface, continuously detecting the force exerted on the workpiece by the cutting tool at their interface, converting said force into a first response signal related to the desired position of said tool, continuously detecting the position of the cutting tool and converting said position into a second response signal, combining said first and second signals and imposing the resultant signal on a second driving member to actuate said second driving member, said first and second signals being continuously and instantaneously generated and combined to provide a continuous and instantaneous resultant signal, and coupling said second driving member to one of said workpiece or cutting tool for effecting a second relative movement therebetween to maintain said reference points at predetermined spaced distances from each other during said work.

7. A method of controlling the operation of a cutting tool on a workpiece, comprising the steps of mounting said workpiece and cutting tool in a machine tool assembly in a position to permit said cutting tool to exert a cutting force on said workpiece at their interface, coupling at least one of said workpiece and cutting tool to a first driving member for effecting a first relative movement therebetween whereby said cutting tool will perform the desired work on said workpiece at their interface, continuously detecting said cutting force and converting it into a first electric signal related to the desired position of the cutting tool, continuously detecting and converting the position of said cutting tool into a second electric signal, continuously combining said first and second signals to produce a third electrical signal, and imposing said third electrical signal on a second driving member to actuate said second driving member, and coupling said second driving member to one of said workpiece or cutting tool for effecting a second relative movement therebetween to maintain predetermined spatial relationships between said workpiece and cutting tool of any vibrating movements of said workpiece or assembly.

* * * * *